July 8, 1947. R. M. DABOUL 2,423,487
MASTICATING FORK
Filed March 28, 1945

Inventor
Richard M. Daboul.

By Clarence A. O'Brien
and Harvey B. Jackson
Attorneys

Patented July 8, 1947

2,423,487

UNITED STATES PATENT OFFICE 2,423,487

MASTICATING FORK

Richard M. Daboul, Tarboro, N. C.

Application March 28, 1945, Serial No. 585,290

3 Claims. (Cl. 30—148)

My invention relates to table cutlery and has for its object to provide a fork for masticating food before being taken into the mouth of the user.

A further object of the invention is to provide a fork for the use of toothless persons, invalids and infants which fork is provided with a masticating means with which the food may be properly masticated before being taken into the mouth of the user.

A still further object of the invention is to provide a fork having a solid flat portion intermediate its handle and tines.

Another object of the invention is to provide a fork having a handle and tines and an offset portion between the handle and tines and constructed so as to thoroughly mash food. A still further object of the invention is to provide in a fork a flattened portion between the handle and tines which if offset from the handle and curved, said portion being provided with longitudinal sinuous ridges with teeth located between said ridges.

Other features and advantages will become more readily apparent from the following description and the accompanying illustrative drawings in which.

Figure 1:
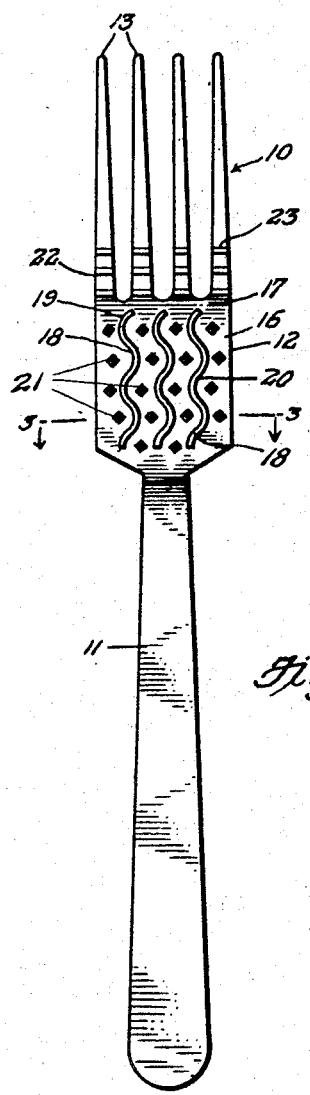
Figure 1 is a bottom plan view of my improved fork.
Figure 2:
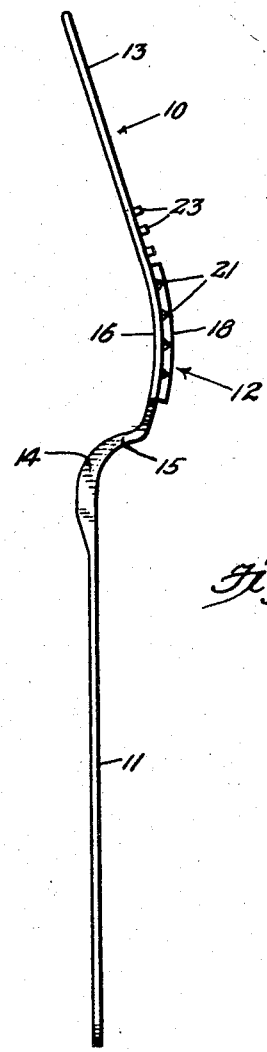
Figure 2 is an edge view thereof.
Figure 3:
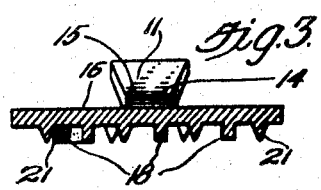
Figure 3 is a sectional view taken on line 3—3 of Figure 1.

In the accompanying drawings as above enumerated and in the following specification, like characters of reference indicate like parts throughout and in which 10, indicates my improved fork which comprises a handle 11, a masticator 12, and tines 13. From the inner portion 14, of the handle the same extends at right angles as at 15, to an arcuate imperforate plate portion 16, from the edge 17, of which the tines 13, project. Provided longitudinally of the fork are a series of spaced apart sinuous ridges 18, 19 and 20, between and around which are a series of downwardly projecting teeth 21. Transversely of the inner ends 22, of the said tines are a series of spaced ribs 23, which in connection with the masticator plate 16, provides means whereby food may be thoroughly masticated upon a plate before being taken into the mouth through the medium of said tines.

It is thought that persons skilled in the art to which the invention relates will be able to obtain a clear understanding of the invention after considering the description in connection with the drawings. Therefore, a more lengthy descripton is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

1. A fork consisting of a handle, a masticator and tines formed in one piece, said masticator being intermediate the handle and tines, sinuous ridges included in the masticator, teeth interspersed among said ridges, and ridges formed transversely of the inner ends of the tines.

2. A fork consisting of a handle, a masticator and tines formed integrally with said handle, said masticator being intermediate the handle and tines, longitudinally extending depending sinuous ridges on said masticator, and staggered rows of teeth formed transversely of said masticator.

3. A fork consisting of a handle, a masticator and tines formed integrally with said handle, said masticator being intermediate the handle and tines, longitudinally extending depending sinuous ridges on said masticator, staggered rows of teeth formed transversely of said masticator, and transversely extending aligned ridges formed at the base of said tines on the lower surface thereof in spaced relation and of shorter length from the base of said tines toward their outer ends.

RICHARD M. DABOUL.

REFERENCES CITED

The following references are of record in the file of this patent:

UNITED STATES PATENTS

| Number | Name | Date |
|---|---|---|
| 2,265,012 | Earp-Thomas | Dec. 2, 1941 |
| 2,169,127 | Rodin | Aug. 8, 1939 |
| 816,104 | Laurent | Mar. 27, 1906 |
| D. 28,446 | Richardson | Apr. 5, 1898 |

FOREIGN PATENTS

| Number | Country | Date |
|---|---|---|
| 462,730 | France | Nov. 28, 1913 |